May 15, 1951      H. W. LORD      2,553,323
VOLTAGE RECTIFIER CIRCUIT
Filed Dec. 2, 1948
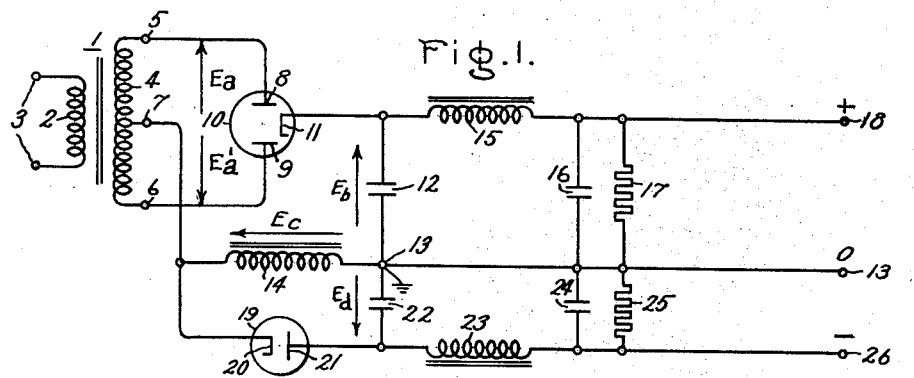
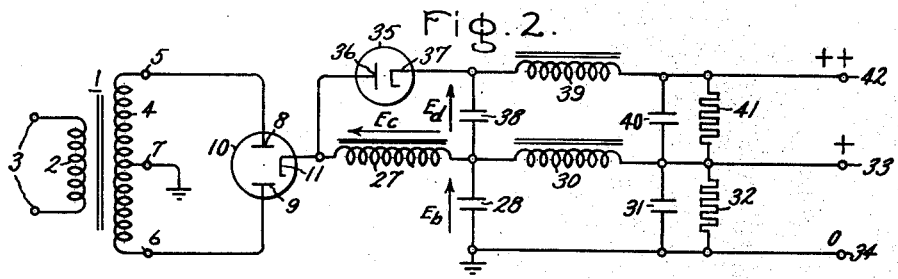
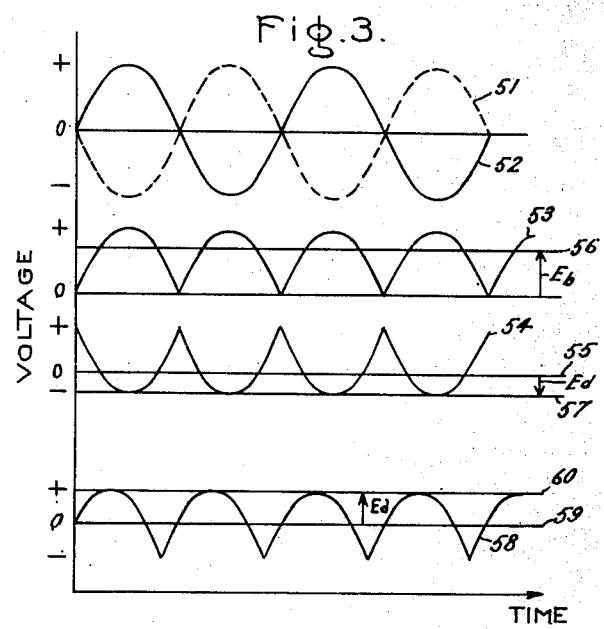
Inventor:
Harold W. Lord,
by Merton D. Moore
His Attorney.

Patented May 15, 1951

2,553,323

UNITED STATES PATENT OFFICE 2,553,323

VOLTAGE RECTIFIER CIRCUIT

Harold W. Lord, Schenectady, N. Y., assignor to General Electric Company, a corporation of New York Application December 2, 1948, Serial No. 63,023

5 Claims. (Cl. 171—97)

This invention relates to voltage rectifiers generally and more particularly to rectifier circuits for use with low current consumption devices such as radio receivers and amplifiers using electronic valves.

In radio receiver and amplifier circuits, it is often necessary to provide, from a source of alternating voltage, a positive unidirectional voltage and a negative unidirectional voltage. It is common practice to provide these unidirectional voltages from an alternating voltage source by means of rectifier circuits. If the source of alternating voltage is subject to fluctuations, the unidirectional output voltages will vary unless some means are provided for regulating them. In many applications, it is desirable that both unidirectional voltages be subject to the same proportional changes in magnitude when the alternating voltage fluctuates. For instance, this is necessary in the case of a rectifier circuit for a class B amplifier using power output valves in push-pull, if the alternating voltage source is unregulated. In such an application, it is desirable to use a fixed bias, rather than a cathode bias resistor, because of the greater power output available thereby. It then becomes necessary to insure that the negative unidirectional voltage used for biasing the valves in the amplifier, changes in the same proportions as the positive unidirectional voltage supplied to the anodes of these valves.

It is an object of this invention to provide a new and improved rectifier circuit which will supply a positive anode voltage and a negative bias voltage and maintain a constant proportion between them during fluctuations of the alternating current supply voltage.

Another object of this invention is to provide a new and improved circuit which will supply two unidirectional voltages from a single transformer to which an alternating voltage is supplied, and which will maintain a substantially constant proportion between the magnitudes of the unidirectional voltages in spite of fluctuations in the alternating voltage supply.

For further objects and advantages and a better understanding of the invention, attention is now directed to the following description and accompanying drawings and also to the appended claims in which the features of the invention believed to be novel are particularly pointed out.

In the drawings, Fig. 1 illustrates an embodiment of my invention for providing a positive anode supply voltage and a negative bias voltage from an alternating voltage source.

Fig. 2 illustrates another embodiment of my invention for providing two positive voltages in series, one with respect to the other, from an alternating supply voltage.

Fig. 3 shows, on a common time scale, certain wave forms occurring in the circuits of Figs. 1 and 2.

Referring to Fig. 1, there is shown a transformer 1 having a primary 2, adapted to be energized at a pair of input terminals 3 from an alternating voltage source, and a secondary winding 4, having a pair of output terminals 5 and 6 and center tap 7. The output terminals 5 and 6 are connected to the anodes 8 and 9 of a double rectifier valve 10 which has a common cathode 11. The cathode is connected by means of a capacitance 12 to a ground point and terminal 13, and the center tap 7 is connected to ground point 13 by an inductance 14. Inductance 15, capacitance 16, and resistance 17 are filtering elements to reduce the alternating current ripple in the unidirectional voltage output at terminals 18 and 13.

Taking into consideration only the elements thus far described, the circuit constitutes a full wave rectifier. When an alternating voltage is applied to the primary of the transformer 1, alternate voltages of opposite phase are developed between the center tap 7 and the anodes 8 and 9 as illustrated by curves 51 and 52 of Fig. 3. Only the positive half cycles of curves 51 and 52 are effective on the cathode 11 and, accordingly, the voltage developed at the cathode with respect to the center tap 7 varies in accordance with curve 53. The value of inductance 14 is chosen so that in conjunction with resistance 17, there is always current flowing through inductance 14 at every instant of the cycle. Under these conditions, the alternating component of the rectified sine wave voltages developed between center tap 7 and anode 11 appears across inductance 14 as a voltage $E_c$. This is illustrated by curve 54 of Fig. 3 which shows a wave of the same shape as that of curve 53, only reversed in phase and disposed about an axis 55 resulting from the elimination of all unidirectional components from the wave.

Under these conditions, a unidirectional voltage of magnitude $E_b$, illustrated by line 56 of Fig. 3, is developed across the capacitance 12 and is equal to the sum of the voltages represented by curves 53 and 54. The voltage $E_b$ is related to the root mean square value $E_a$ of the voltages developed between the center tap and either terminal of the secondary of the transformer 1 as follows:

$$E_b = \frac{E_a}{1.11} - i(R_t + R_L) \tag{1}$$

where $i$ = current through valve 10,
$R_t$ = equivalent resistance of valve 10,
$R_L$ = ohmic resistance of inductance 14.

This voltage is largely independent of the current drawn by a load connected between terminals 18 and 13 provided that the equivalent resistance of valve 10 and the ohmic resistance of inductance 15 are small.

My invention resides more particularly in the circuit as modified by the addition of a diode valve 19 having a cathode 20 connected to center tap 7 and an anode 21 connected in series with a capacitance 22 to ground point 13. The voltage $E_c$ existing across the inductance 14 measured from the ground point 13 towards the center tap 7 is as illustrated by curve 54 of Fig. 3. Only a very small unidirectional component appears across inductance 14 because its only impedance to unidirectional current is the resistance of the winding which can be made very low. The rectifier valve 19 uses the negative peaks of the voltage $E_c$ to charge the capacitor 22 to a value $E_d$ approximately equal to these negative peaks, as illustrated by line 57 of Fig. 3. When capacitance 22 is large enough that only a small fraction of its total charge is lost during the non-charging part of a cycle, the magnitude $E_d$ of the voltage across capacitance 22 is related to the root mean square value $E_a$ as follows:

$$E_d = E_a \sqrt{2}\left(1 - \frac{2}{\pi}\right) \quad (2)$$

This equation assumes that the impedance of the valve 19 and the ohmic resistance of the inductance 14 are both small enough to be neglected. The remainder of the circuit comprising inductance 23, capacitance 24, and resistance 25 provides further filtering of the unidirectional negative voltage developed across capacitance 22 so that a negative unidirectional voltage relatively free from ripple components is available at output terminal 26. The condition for the observance of Equation 1, which defines a constant relation between the magnitude $E_b$ of the unidirectional voltage between terminals 18 and 13, and the root mean square value $E_a$ of the voltage developed between the center tap and either terminal of the secondary of transformer 1, is that current flows continuously through inductance 15. This is assured in practice by selecting resistance 17 such that sufficient current will flow through it to assure this condition, notwithstanding a very large value of impedance connected between terminals 18 and 13.

Once these conditions have been fulfilled, the magnitude $E_b$ of the unidirectional voltage output is proportional solely to the magnitude of the alternating voltage input. As for the negative unidirectional voltage developed between the output terminals 26 and 13, it also bears a constant relation to the root mean square value $E_a$ of the alternating voltage input as defined by Equation 2. The only condition for the maintenance of the relations defined by this equation is that the current drawn from terminal 26 be small enough that capacitance 22 does not discharge appreciably between charging cycles. Accordingly, the magnitudes of both positive and negative output voltages appearing between terminals 13 and 18, and 13 and 26, respectively, are in a substantially constant relation to the alternating input voltage and the magnitudes of both will vary proportionally and in the same direction.

Referring to Fig. 2, there is shown another embodiment of my invention in which basically the same circuit elements are used as in the embodiment of Fig. 1 but with different connections to provide two positive voltages in series, one with respect to the other. The transformer 1 is connected to the rectifying valve 10 in substantially the same manner as in Fig. 1 and, accordingly, the same reference numerals have been maintained. The center tap 7 of the secondary winding of transformer 1 is grounded. The cathode 11 of valve 10 is connected to one terminal of an inductance 27 whose other terminal is connected to ground through a capacitor 28. The junction of inductance 27 and capacitor 28 is connected through a filter network comprising an inductance 30, a capacitance 31, and a resistance 32 to an output terminal 33. The other output terminal 34 is connected to a common ground point.

Taking into consideration only the elements thus far described, the circuit constitutes a full-wave rectifier providing a positive output at terminal 33 with respect to the grounded terminal 34 in similar manner to the circuit of Fig. 1. By choosing resistance 32 small enough that current flows continuously through inductance 27, a voltage $E_c$ is developed across inductance 27, as illustrated by curve 58 of Fig. 3, which shows a wave of the same shape as that of curve 53 only disposed about an axis 59 resulting from the elimination of all unidirectional components from the wave.

My invention in this embodiment resides more particularly in the circuit as modified by the addition of a diode valve 35 having an anode 36, connected to the junction point of inductance 27 and the cathode 11 of valve 10, and a cathode 37, connected in series with a capacitance 38 to the junction point of inductance 27 and capacitance 28. In operation, the alternating voltage $E_c$ existing across inductance 27 causes, by means of diode valve 35, a positive unidirectional voltage of magnitude $E_d$ to be developed across capacitance 38. The magnitude of $E_d$ in this embodiment is again given by Equation 2. A filter network comprising an inductance 39, and capacitance 40, and a bleeder resistance 41 is interposed between the terminals of capacitance 38 and the output terminals 33 and 42 to reduce any ripple components from the positive unidirectional voltage available at terminal 42 with respect to terminal 33.

The conditions necessary for the maintenance of the relations defined by Equations 1 and 2 in the embodiment of Fig. 2 are the same as those required in the embodiment of Fig. 1. These conditions are that the current through inductance 27 flows continually, and that the current drawn through inductance 39 does not appreciably discharge capacitance 38 during the intervals between charging periods. When these conditions are fulfilled, a positive voltage is developed at terminal 33 with respect to terminal 34 whose magnitude is, within a predetermined range, independent of the current drawn by an utilization circuit connected to these terminals. Also a positive unidirectional voltage is developed at terminal 42 with respect to terminal 33. Both these positive unidirectional output voltages are in a substantially constant relation to the value of the alternating voltage supplied to the input terminals 3. Moreover, both unidirectional output voltages vary proportionally when the alternating input voltage changes in magnitude.

The two embodiments of my invention which I have described both provide unidirectional output voltages whose magnitudes are in a constant ratio to the amplitude of the alternating voltage applied. This is often a requirement in unidirectional sources of power for electronic apparatus, and my invention provides a simple and inexpensive circuit for meeting such requirements.

While certain specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. A circuit for providing from an alternating voltage source unidirectional voltages of opposite polarity with reference to a ground point, the magnitudes of said unidirectional voltages to be maintained in a substantially constant fixed ratio with respect to the magnitude of said alternating voltage, comprising means for developing between a pair of terminals and a center tap alternating voltages proportional to the alternating voltage from said source, a first rectifying device having a pair of anodes and a cathode, said anodes being connected to said terminals, an inductance connected between said center tap and said ground point, a filter network connected between the cathode of said first rectifying device and said ground point, said filter network drawing current continuously through said inductance, a second rectifying device having an anode and a cathode, the cathode of said device connected to said center tap, and the anode of said device connected in series with a capacitance to said ground point, an output terminal for one of said unidirectional voltages provided by said first filter network, and an output terminal for the other of said unidirectional voltages provided by the cathode of said second rectifying device.

2. A circuit for providing from an alternating voltage source positive and negative unidirectional voltages with reference to a ground point, the magnitudes of said unidirectional voltages to be maintained in a substantially constant fixed ratio with respect to the magnitude of said alternating voltage, comprising means for developing between a pair of terminals and a center tap alternating voltages proportional to the alternating voltage from said source, a rectifying valve having a pair of anodes and a cathode, said anodes being connected to said terminals, an inductance connected between said center tap and said ground point, a filter network connected between said cathode and said ground point, said filter network drawing current continuously through said inductance, a diode valve having an anode and a cathode, the cathode of said diode valve being connected to said center tap, and the anode of said diode valve being connected in series with a capacitance to said ground point, an output terminal for said positive unidirectional voltage provided by said first filter network, and an output terminal for said negative unidirectional voltage provided by the anode of said diode.

3. A circuit for providing from an alternating voltage source a pair of unidirectional voltages of the same polarity with reference to a ground point, the magnitudes of said unidirectional voltages to be maintained in a substantially constant fixed ratio with respect to the magnitude of said alternating voltage, comprising means for developing between a pair of terminals and said ground point alternating voltages of opposite phase proportional to the alternating voltage from said source, a pair of rectifying devices each containing a pair of opposed poles, a common connection between a pair of like poles in said devices, separate connections from said other poles to said terminals, an inductance serially connected between said common connection and a filter network, said filter network drawing current continuously through said inductance, a rectifier having a pair of opposed poles, the other pole of said rectifier being connected to said common connection and the like pole of said rectifier being connected in series with a capacitance to the junction of said inductance and said filter network, an output terminal for the other of said positive unidirectional voltages provided by the like pole of said rectifier.

4. A circuit for providing from an alternating voltage source, a pair of positive unidirectional voltages with reference to a ground point, said unidirectional voltages to be maintained in a substantially constant fixed ratio with respect to the magnitude of said alternating voltage, comprising means for developing between a pair of terminals and said ground point alternating voltages of opposite phase proportional to the alternating voltage from said source, a rectifying valve having a pair of anodes and a cathode, said anodes being connected to said terminals, an inductance serially connected between said cathode and a filter network, said filter network drawing current continuously through said inductance, a diode valve having an anode and a cathode, the anode of said diode valve being connected to said cathode, and the anode of said diode valve being connected in series with a capacitance to the junction of said inductance and said filter network, an output terminal for one of said positive unidirectional voltages provided by said filter network, and an output terminal for the other of said positive unidirectional voltages provided by the cathode of said diode valve.

5. A circuit for providing a pair of unidirectional voltages having a common terminal, a transformer, a full wave rectifier connected to rectify the voltage of said transformer and to supply the rectified voltage between said common terminal and a second terminal, an inductance connected in circuit between said rectifier and said common terminal, and a second rectifier connected in circuit between the electrode of said first rectifier which is connected to said inductance and a third terminal, the electrode of said second rectifier remote from said one electrode being connected for alternating current to the opposite terminal of said inductance whereby unidirectional voltage with respect to said common terminal appears at both said second and third terminals.

HAROLD W. LORD.

REFERENCES CITED

The following references are of record in the file of this patent:

UNITED STATES PATENTS

| Number | Name | Date |
|--------|------|------|
| 2,418,114 | Frankel | Apr. 1, 1947 |